INVENTORS
CARL F. BLAKELY
DONALD E. LONGMIRE
BY Paul L. Gardner
ATTORNEY

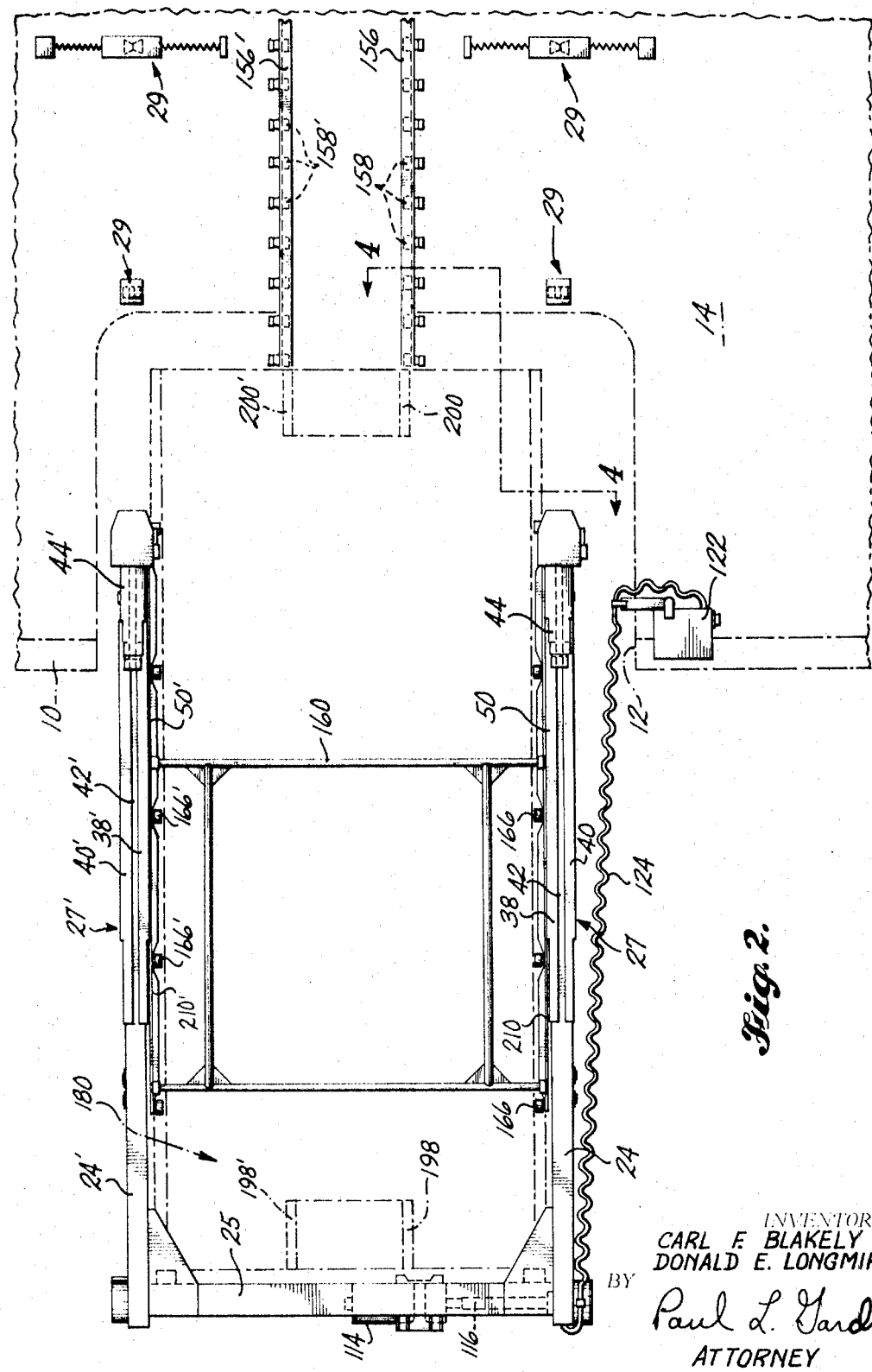

Aug. 26, 1969  C. F. BLAKELY ET AL  3,463,334
CARGO LOADING APPARATUS
Filed April 17, 1967  5 Sheets-Sheet 3
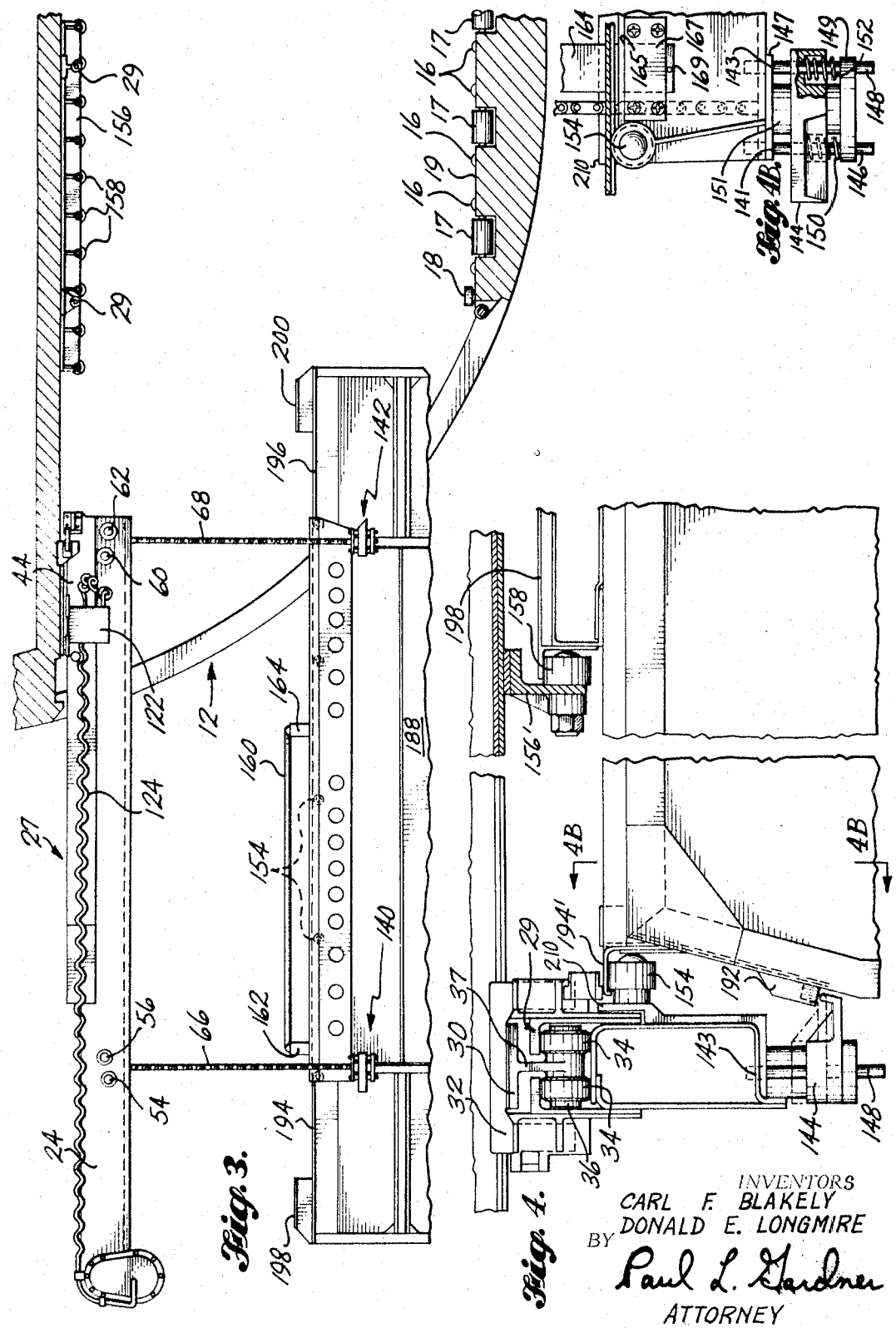
INVENTORS
CARL F. BLAKELY
DONALD E. LONGMIRE
BY
Paul L. Gardner
ATTORNEY

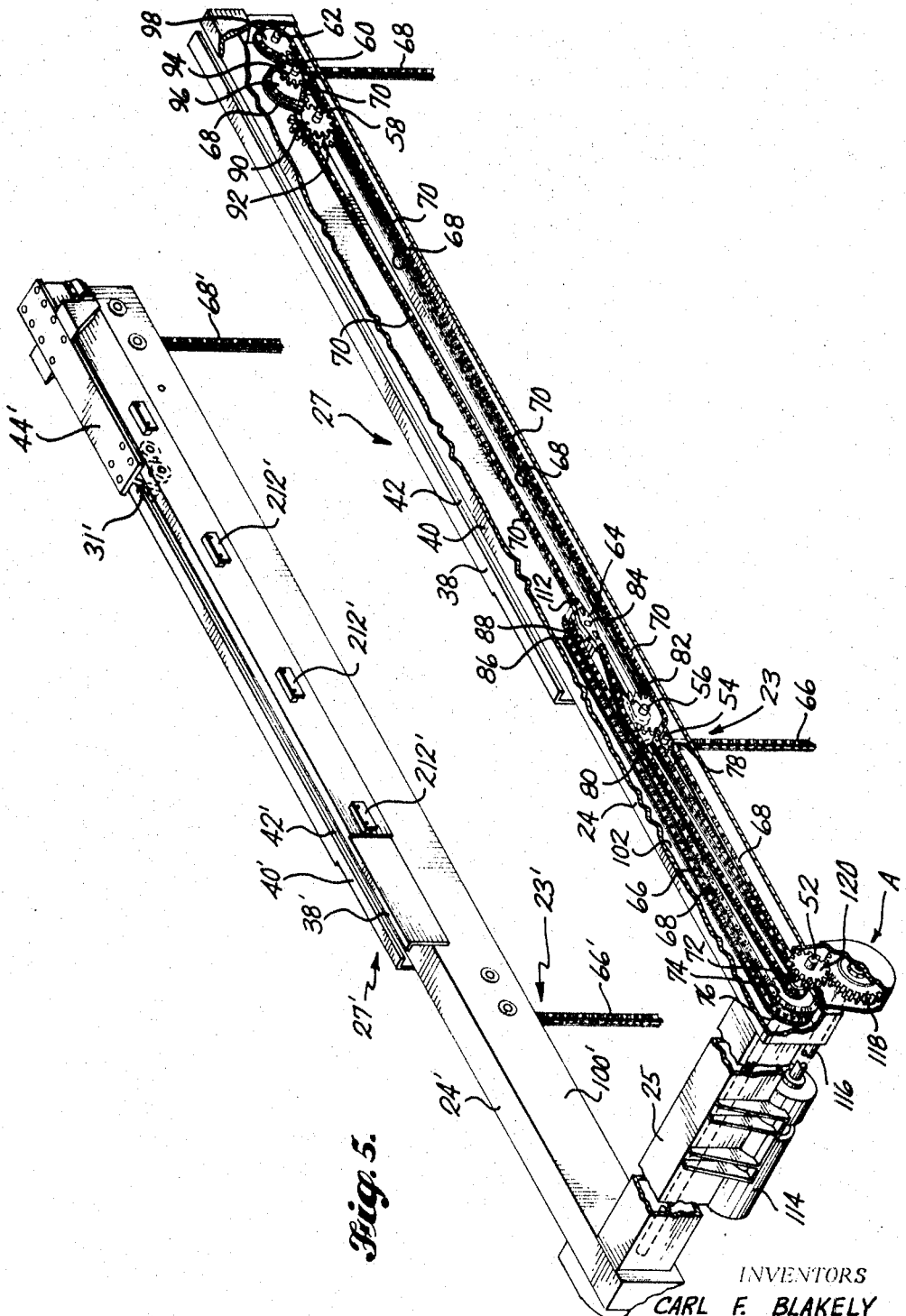

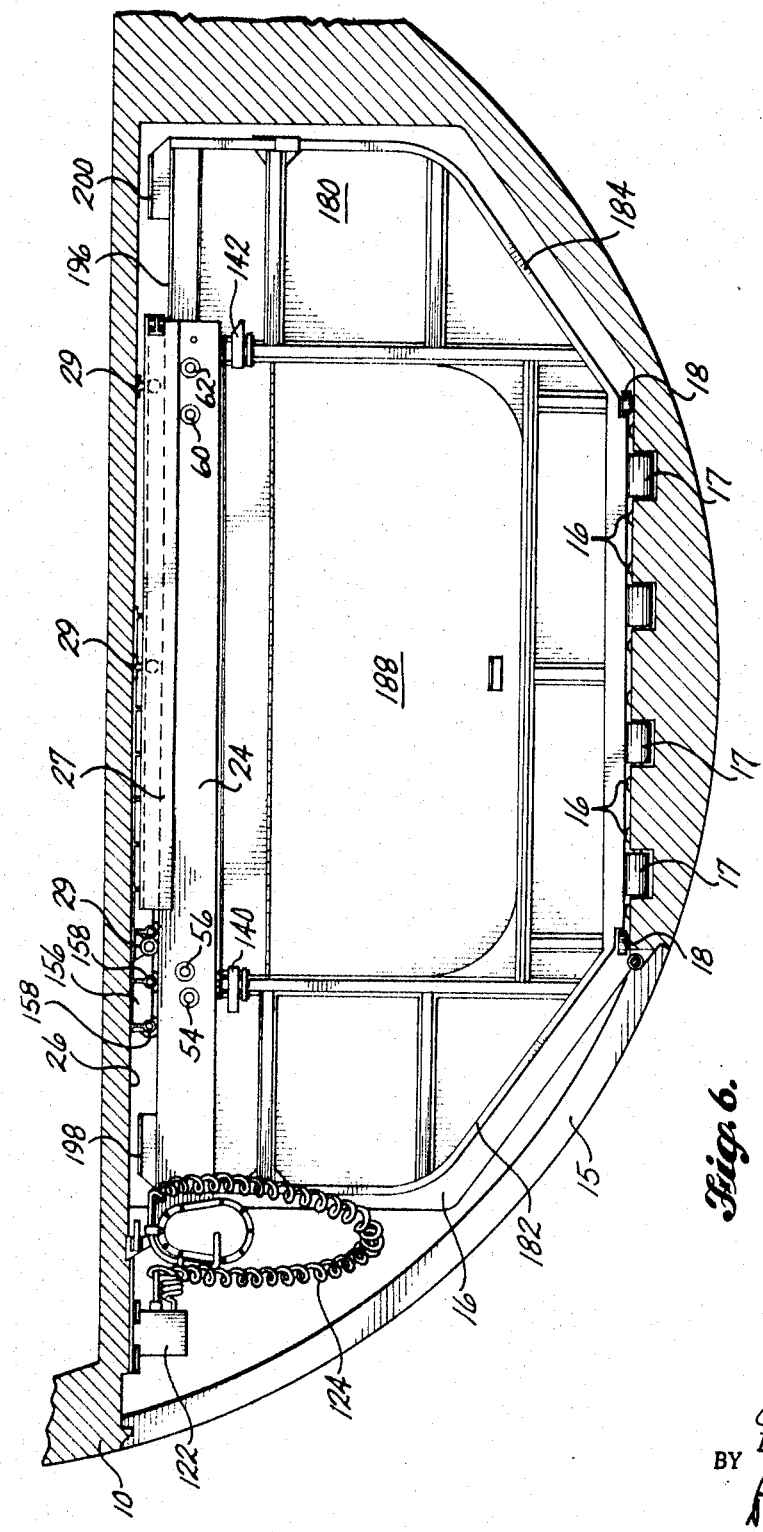

United States Patent Office 3,463,334
Patented Aug. 26, 1969

3,463,334
CARGO LOADING APPARATUS
Carl Frederick Blakely, Bellevue, Wash., and Donald E. Longmire, West Los Angeles, Calif., assignors to The Boeing Company, Seattle, Wash., a corporation of Delaware
Filed Apr. 17, 1967, Ser. No. 631,476
Int. Cl. B65d 9/00; B64c 1/22
U.S. Cl. 214—75                              3 Claims

ABSTRACT OF THE DISCLOSURE

A cargo loading apparatus mounted in an airplane cargo compartment for sliding movement between a stowed position inside the compartment and an operating position outside of the airplane. The apparatus includes a hoist beam assembly mounted on transversely extending rollers on the ceiling of the cargo compartment, a lift rail assembly including cargo container engaging hooks, and a cable assembly connected between the hoist beam assembly and the lift rail assembly for raising and lowering the latter. Transversely extending rollers are provided on the lift rail assembly and on the ceiling of the cargo compartment for transferring cargo containers laterally between the compartment and the lift rail assembly when the latter is in its raised position.

Background of the invention

The present invention relates generally to cargo handling equipment, and more particularly to an improved cargo loading apparatus adapted to be stowed in an airplane cargo compartment when the plane is in flight without occupying valuable storage area.

The development of faster and larger jet airplanes has made it more convenient and economical to travel and ship cargo by air. The increased activity in air travel has, in turn, accented the need for more effective cargo loading equipment.

Airplane cargo compartments may be loaded through the side, bottom, nose or tail end of the fuselage. Accessibility, maintainability and aerodynamic design requirements, however, have rendered the side loading type of aircraft cargo compartment the most efficient design for many airplanes.

Various methods and devices for loading cargo in the side-loading type of airplane cargo compartment have been proposed. These have included the so-called "bucket brigade" system where cargo is manually lifted into the cargo compartment by baggage handlers, ground vehicles having elevator means for lifting the cargo from the ground to the cargo compartment loading door, and hoisting apparatuses adapted to be attached to the airplane cargo loading door, such as those disclosed in U.S. Patents 2,950,073 and 3,026,071.

The "bucket brigade" operation is obviously inefficient as it requires several men and a substantial amount of time to load the plane. The ground vehicles are relatively expensive and cannot be used in remote locations where it is often necessary to load or unload a plane.

The detachable hoist mechanisms are also subject to several disadvantages. The airplane's cargo loading door must be provided with adequate structural attach points for the mechanisms. Moreover, the mechanisms may not be available at remote loading stations, and they occupy valuable cargo storage space if they must be carried in the plane itself. Still another deficiency of such mechanisms is that they require appreciable time and manual effort to attach to and detach from the plane.

Summary of the invention

In view of the foregoing, it is an object of this invention to provide an improved aircraft cargo loading apparatus which is more efficient in operation than the cargo loading methods and mechanisms which have been proposed heretofore.

Another object of the present invention is to provide an improved aircraft cargo loading apparatus which may be stowed in the airplane during flight without occupying valuable storage space.

The foregoing objects have been realized by the aircraft cargo loading apparatus of the present invention which comprises a hoist beam assembly mounted on the ceiling of the airplane cargo compartment for sliding movement between a stowed position inside the compartment and an operating position outside of the airplane, and a cargo lifting assembly connected to the hoist beam assembly and adapted to be raised and lowered relative thereto. Transfer means are provided on the cargo lifting assembly and on the ceiling of the cargo compartment for facilitating lateral transfer of the cargo between the cargo compartment and the cargo lifting assembly when the latter is in its raised position.

Brief description of the drawings

In the drawings:

FIGURE 2 is a top plan view of the cargo loading apparatus illustrated in FIGURE 1, the airplane fuselage in which it is installed being illustrated in phantom lines;

FIGURE 3 is a fragmentary side elevation view, partly in section, of the cargo loading apparatus illustrated in FIGURES 1 and 2 in the process of lifting a cargo container;

FIGURE 4 is a fragmentary rear elevation view, partly in section, taken generally along the line 4—4 of FIGURE 2 and illustrating in detail the cooperative relationship between the cargo container, the loading apparatus, and the airplane cargo compartment;

FIGURE 4B is a fragmentary side elevation view, partly in section, taken along the line 4B—4B of FIGURE 4 and showing some details of one of the cargo container engaging assemblies;

FIGURE 5 is a perspective view of the hoist beam assembly of the cargo loading apparatus illustrated in FIGURES 1-4, with portions thereof broken away to show some of the details of the cable assembly for raising and lowering the lift rail assembly; and FIGURE 6 is a cross-sectional side elevation view showing the cargo loading apparatus of FIGURES 1-5 carrying a cargo container and stored in an airplane fuselage as it is during flight.

Description of the preferred embodiment

Figure 1:
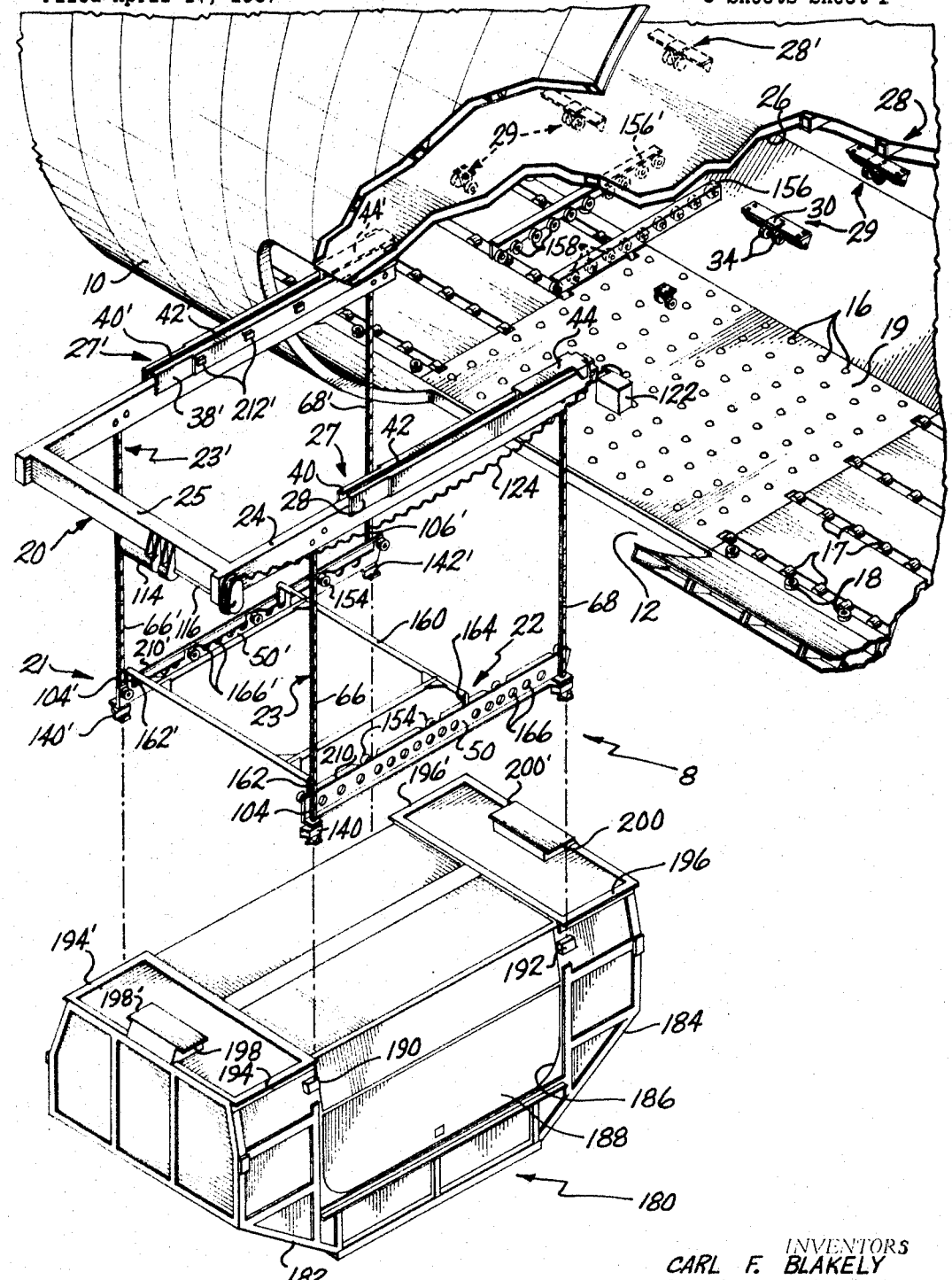
FIGURE 1 is a perspective view of a cargo loading apparatus constructed in accordance with the teachings of the present invention and installed in the cargo compartment of an airplane fuselage, with portions of the fuselage being broken away to more clearly show some of the details of the loading apparatus.

Referring now to the embodiment illustrated in the drawings, and particularly to FIGURE 1, the cargo loading apparatus 8 is seen to be installed in an airplane fuselage 10 having a doorway 12 in one side thereof. The doorway 12 leads to a cargo compartment 14, and may be selectively closed by a hinged door 15 (FIGURE 6) which forms part of the fuselage 10. Conventional ball bearings 16 and rollers 17 and 18 are provided in the floor 19 of the cargo compartment 14 for facilitating positioning and longitudinal transfer of cargo once it has been placed in the compartment 14.

The cargo loading apparatus 8 comprises a hoist beam assembly 20 which carries a cargo lifting assembly 21, the latter including a lift rail assembly 22 and a pair of chain assemblies 23, 23' for raising and lowering the lift rail assembly relative to the hoist beam assembly.

The hoist beam assembly 20 comprises a pair of parallel, transversely extending beam members 24, 24' connected by a longitudinally extending cross beam 25. Beam members 24, 24' are mounted on the ceiling 26 of the cargo compartment 14 for transverse sliding movement by means of cooperating runners 27, 27' mounted on the beam members and rows 28, 28' of roller assemblies 29 mounted on the ceiling. Thus, the hoist beam assembly 20, and hence the entire cargo loading apparatus 8, may be slid on roller assemblies 29 between a stowed position (FIGURE 6) within the cargo compartment and an operating position (FIGURES 1 and 2) outside of the fuselage 10.

As best shown in FIGURE 4, each roller assembly 29 comprises a bracket 30 secured to a mounting structure 32 on the cargo compartment ceiling 26, and a pair of rollers 34, 34' mounted on a horizontal axle 36 on either side of a vertical flange 37 which forms part of the bracket 30.

The runners 27, 27' include split halves 38, 40 and 38', 40', respectively, which are welded, bolted or otherwise suitably secured on either side of each of the beam members 24, 24' so as to define longitudinal slots 42, 42' therebetween for receiving the vertical flanges 37 of the roller assemblies 29 when the hoist beam assembly 20 is slid transversely into the cargo compartment 14. A pair of runner guides 44, 44' are secured on the cargo compartment ceiling 26 adjacent the doorway 12 and are transversely aligned with the slots 42, 42' in the runner 27, 27' for insuring alignment of the runners with the roller assemblies 29 as the hoist beam assembly 20 is slid into the cargo compartment. As best shown in FIGURE 5, the guides 44, 44' are T-shaped in cross-section and include downwardly extending flanges 46, 46' which are received in the longitudinal slots 42, 42' of the runners, and roller assemblies 31, 31', respectively, secured to the flanges.

The lift rail assembly 22 of the cargo lifting assembly 21 includes a pair of parallel, transversely extending lift rails 50, 50' vertically aligned with and suspended from the hoist beams 24, 24' by means of the chain assemblies 23 and 23'. FIGURE 5 shows the details of chain assembly 23; chain assembly 23' is substantially identical.

Referring now to FIGURE 5, the chain assembly 23 is seen to comprise a driven shaft 52, a series of laterally spaced idler shafts 54, 56, 58, 60 and 62, each having one or more sprockets mounted thereon, a movable pulley 64, a forward lift chain 66, a rear lift chain 68, and a power chain 70. (The forward chain 66, rear chain 68, and power chain 70 are each numbered several times in FIGURE 5 for clarity.) The driven shaft 52 has a drive sprocket 72 fixedly mounted thereon and idler sprockets 74, 76 rotatably mounted thereon; idle shaft 54 has idler sprockets 78, 80 mounted thereon; idler shaft 56 has a single idler sprocket 82 mounted thereon; idler shaft 58 has idler sprockets 90, 92 mounted thereon; idler shaft 60 has idler sprockets 94, 96 mounted thereon; and idler shaft 62 has a single idler sprocket 98 mounted thereon. The idler shafts 54, 56, 58, 60, and 62 are rotatably mounted between the side walls 100, 102 of the beam members 24 by means of suitable ball bearing assemblies (not shown), and the sprockets are preferably rotatably mounted on their respective shafts (except for drive sprocket 72) to minimize frictional drag in the assembly.

Tracing the path of the forward lift chain 66, it is seen (FIGURE 1) that the chain has its lower end 104 secured to the lift rail 50. From that point, the chain passes over the idler sprocket 80, around the idler sprocket 76, and has its opposite end 86 secured to the pulley 84.

The rear lift chain 68 also has its lower end 106 secured to the lift rail 50 (FIGURE 1). From that point, the chain 68 passes over the idler sprocket 96, under the idler sprocket 92, around the idler sprocket 74, and has its opposite end 88 secured to the pulley 84.

The power chain 70 has one of its ends 110 secured to the left side of pulley 64 (as viewed in FIGURE 5) and passes over sprocket 82, around drive sprocket 72, over idler sprocket 78, under idler sprocket 82, around idler sprocket 98, under idler sprocket 94, over idler sprocket 90, and has its other end 112 secured to the right side of pulley 64.

A conventional reversible electric motor 114 is secured to the cross beam 25 and selectively rotates a drive shaft 116 in either a clockwise or counterclockwise direction. A gear wheel 118 is fixedly mounted on the outer end of the drive shaft 116 and meshes with a cooperating gear wheel 120 fixedly mounted on one end of the driven shaft 52. Thus, when the motor 114 rotates the drive shaft 116 and the gear wheel 118 in one direction (clockwise or counterclockwise), the gear wheel 118 will rotate the gear wheel 120 and driven shaft 52 in the opposite direction. As best shown in FIGURE 1, the motor 114 is electrically connected to a switch box 122 and suitable source of electric power (not shown) inside the fuselage 10 by a conventional extendible electric cord 124.

To raise or lower the lift rail assembly 22, an attendant simply operates the switch box 122 from inside the cargo compartment 14 to turn the motor 114 on and rotate the drive shaft 116 in the desired direction. If it is desired to raise the lift rail assembly, the switch box controls are operated to cause the reversible motor 114 to rotate the drive shaft 116 and gear wheel 118 in a counterclockwise direction (as viewed from point "A" in FIGURE 5). This will cause the gear wheel 120, driven shaft 52, drive sprocket 72 and a similar drive sprocket (not shown) on the opposite end of the shaft 52 to be rotated in a clockwise direction. The drive sprockets 72 will drive their respective power chains 70 in a clockwise direction, thereby causing the pulleys 64 to move to the right, as viewed in FIGURE 5. This will raise the lower ends 104, 106 and 104', 106' of the chains 66, 68 and 66', 68' and the lift rail assembly 22 attached thereto.

A pair of spaced cargo container engaging assemblies 140, 142 and 140', 142' are welded or otherwise suitably secured on the bottoms of each of the lift rails 50 and 50'. As best shown in FIGURES 4 and 4B, each of the cargo container engaging assemblies includes a generally hook-shaped member 144 guided for limited vertical movement by a pair of vertically extending pins 146 and 148. The pins are secured to the hook-shaped member and extend through apertures in the upper and lower horizontal walls 147, 149 of a cage 151 which houses the hook-shaped member. The hook-shaped member and the attached pins are normally biased upwardly by coil springs 150 and 152.

A plurality of laterally spaced roller members 154 are mounted on the lift rails 50 and 50', and a pair of spaced sets 156 and 156' of laterally spaced rollers 158 (best shown in FIGURE 1) are mounted on the ceiling 26 of the cargo compartment 14 for transferring cargo containers between the cargo compartment and the lift rail assembly in a manner described hereinafter. A cross-frame structure 160 (see FIGURES 1–3) extends across the lift rails 50 and 50' and includes downwardly extending feet portions 162, 164 and 162', 164' which are slidably received in slots 165 provided in the lift rails 50 and 50' by virtue of struck-out tabs 167 (see FIGURE 4B) secured on the inside of the rails. A pin 169 (FIGURE 4B) is provided on the bottom of each foot to prevent the foot from being withdrawn from its slot 165. The lift rails may further include cutout areas 166 and 166' which reduce their weight.

One type of cargo container which the cargo loading apparatus 8 is designed to load and unload is shown in FIGURES 1 and 6 and designated by the numeral 180. The container 180 is generally configured to occupy a maximum amount of usable space in the cargo compartment in which it is to be carried. If the plane's cargo compartment is located in the lower portion of the fuselage, as is the compartment 14 illustrated in the drawings, the compartment is generally semi-circular in cross-section (see FIGURE 6) and the container should be similarly shaped. Accordingly, the lower end edges of the container 180 are beveled, as at 182 and 184.

As best shown in FIGURE 1, the container 180 is adapted to hold a number of individual pieces of baggage, and includes an access opening 186 provided with a closure member 188. A pair of spaced, hook receiving flanges 190, 192 and 190', 192' are welded or otherwise suitably secured on either side of the container 180 for receiving the generally hook-shaped members 144 of the cargo container engaging assemblies 140, 142 and 140', 142'. The container 180 further includes pairs of spaced runners 194, 196 and 194', 196' secured along its upper side edges adjacent the ends thereof, and additional pairs of runners 198, 200 and 198', 200' secured on the top of the container 180 adjacent its ends. The runners 194, 196, 194', 196', 198, 200, 198' and 200' cooperate with the rollers 154 and 154' on the lift rails 50 and 50' and the rollers 158 on the cargo compartment ceiling 26 in a manner described more fully hereinafter to facilitate the lateral transfer of the cargo container 180 into and out of the cargo compartment 14 when the lift rail assembly 22 is in its raised position.

In operation, assume that initially the cargo loading apparatus 8 is stored in the airplane cargo compartment 14 (as shown in FIGURE 6, but without the cargo container 180). When it is desired to load one or more cargo containers 180, the first container to be loaded is positioned on the ground directly below the cargo compartment door 15 (FIGURE 6) and the door is opened. The hoist beam assembly 20 is then pushed out of the compartment 14 through the doorway 12, the cooperating beam runners 27, 27' and roller assemblies 29 facilitating such movement. The hoist beam assembly 20 will carry the lift rail assembly 22 outside of the plane along with it. With the hoist beam assembly 20 extending outside of the cargo compartment 14, the controls of the switch box 122 are operated to activate the motor 114 and lower the chain assemblies 23 and 23' until the cargo container engaging assemblies 140, 142 and 140', 142' on the lift rails lie just beneath the hook receiving flanges 190, 192 and 190', 192' on the container to be loaded.

The cross-frame structure 160 is then lifted relative to the lift rails 50 and 50' and the controls on the switch box 122 are operated to raise the chain assemblies 23, 23' and the lift rails 50, 50' until the hook-shaped members 144 engage the hook receiving flanges on the container and the runners 194, 196 and 194', 196' on the container are resting on the lift rail rollers 154. At this point, the motor 114 is stopped and the cross-frame structure 160 is pushed downwardly to force its feet portions 162, 164, 162', 164' downwardly in their slots 165 (FIGURE 4B) in the lift rails 50 and 50' and prevent the container from slipping off the lift rail rollers and hook-shaped members. It should be noted that the distance between the plane defined by the top of the lift rail rollers 154 and the hook-shaped members 144 in their normal position (spring-biased upwardly) is slightly greater than the distance between the cargo container runners 194, 196, 194' and 196' and the hook receiving flanges 190, 192, 190', 192' so that as the chain assemblies 23, 23' are initially raised, the hook-shaped members 144 will first engage their respective flanges on the container and will be slightly depressed by the weight of the container as they lift it until the lift rail rollers 154 contact the undersides of the container runners 194, 196, 194' and 196'. An attendant should be present on the ground to insure that the hook-shaped members engage the flanges on the container and to lock the cross-frame structure 160.

Next, the controls of the switch box 122 are again operated to activate the motor 114 and raise the chain assemblies 23 and 23', the lift rails 50 and 50' and the cargo container 180 carried thereby. When the lift rails 50 and 50' reach the bottoms of the hoist beams 24 and 24', the upper ends 141, 143 of the pins 146, 148 which extend through the top 147 of the cargo container engaging assemblies 140, 142, 140' and 142' will strike the lower surfaces of the hoist beams and be driven downwardly as the chain assemblies 23 and 23' continue to rise (see FIGURES 4 and 4B). This downward movement of the pins 146 and 148 will force the hook-shaped members 144 downwardly against the bias of their springs 150 and 152, thereby disengaging the hook-shaped members from the hook receiving flanges on the container. The lift rails continue to rise until the upper surface of the cargo container engaging assemblies 142 strike the lower surface of the hoist beams 24 and 24' (see FIGURE 4B), at which point the upper vertical edges 210 and 210' on the lift rails will lie under the outwardly and downwardly extending flanges 212 and 212' on the hoist beams 24 and 24'.

With the hook-shaped members 144 disengaged from their associated hook receiving flanges 190, 192, 190' and 192' on the cargo container 180, the container will be free to slide laterally into the cargo compartment 14. As the cargo container is pushed laterally into the cargo compartment on the lift rail rollers 154, the centrally disposed cargo container runners 198, 198', 200 and 200' will engage the rollers 158 on the ceiling of the cargo compartment so that as the forward side runners 196 and 196' leave the rollers 154, the forward central runners 200 and 200' will keep the inboard end of the container supported until the container is pushed all the way into the cargo compartment.

When the cargo container 180 is entirely in the cargo compartment, the central runners 198, 198' and 200, 200' will be disposed on either end of the roller sets 156 and 156', thereby permitting the container to be pushed fore or aft in the fuselage 10 on the floor mounted ball bearings 16 and rollers 17.

Additional cargo containers may then be loaded in the manner described above. However, the last cargo container to be loaded is not pushed into the cargo compartment on the lift rail rollers 154 and cargo compartment ceiling rollers 158. Rather, when the container and lift rails are raised to the level of the compartment, the hoist beam assembly 20 is pushed into the cargo compartment along the rollers 29, and carries the lift rail structure and the last container along with it. Thus, the entire assembly may be stored in the cargo compartment while carrying a cargo container, and will not occupy valuable storage space (see FIGURE 6).

The unloading operation is simply the loading operation in reverse. Initially, the hoist beam assembly 20 is rolled out of the cargo compartment and carries the lift rail assembly and the last cargo container loaded along with it. The controls on the switch box 122 are then operated to lower the lift rail assembly. When the container reaches the ground, the cross bar assembly 160 is lifted and the container is removed. Meanwhile, the next cargo container in the cargo compartment 14 is pushed along the rollers 17 and ball bearings 16 until the central container runners 198, 198' and 200, 200' are laterally aligned with the rollers 156, 156'. When the empty lift rail assembly 21 is raised, the container is pushed laterally along the cargo compartment ceiling rollers 158 and the lift rail rollers 154 until it rests entirely on the lift rail rollers. The controls of the switch box 122 are then operated to lower the lift rail assembly and the container.

As can be seen from the foregoing, the cargo loading apparatus of the present invention provides an improved facility for loading and unloading an airplane cargo compartment. The apparatus may be stored in the airplane during flight without occupying valuable cargo storage area, and hence is available at remote loading stations where ground unloading equipment is not available. Moreover, the apparatus may be operated by a minimum number of attendants to load or unload a plane in a minimum amount of time.

We claim:
1. In combination with a longitudinally extending airplane fuselage having a ceiling, a floor, and two spaced side walls defining a cargo compartment; one of said side walls including means defining a cargo receiving doorway therein; an apparatus for transferring a cargo container between the cargo compartment and the ground comprising:
 (a) transversely extending hoist beam means slidably mounted on said cargo compartment ceiling for transverse movement between a stowed position wherein said hoist beam means is wholly contained within said cargo compartment, and an operating position wherein a substantial portion of said hoist beam means extends through said doorway and external of said cargo compartment;
 (b) transversely extending lift rail members;
 (c) cargo container engagement means carried by said lift rail members;
 (d) hoisting means carried by said hoist beam means and connected to said lift rail members for vetrically moving said lift rail members and said cargo container engagement means relative to said hoist beam means between a raised position wherein said cargo container engaging means is disposed adjacent to said hoist beam means and a lowered position wherein said cargo container engaging means is adapted to receive or release the cargo container on the ground; and
 (e) cargo container transfer means carried by said lift rail members and by the cargo compartment ceiling adapted to support the cargo container for transverse sliding movement between a position external of said cargo compartment and a position wholly within said cargo compartment when said cargo container engaging means is in the raised position and when said hoist beam means is in the operating position.

2. The combination as claimed in claim 1 wherein said cargo container transfer means comprises:
 (a) first roller means mounted on said lift rail members and adapted to engage first runner means on the cargo container to support the cargo container for transverse sliding movement when the cargo container is in a position external of the cargo compartment; and
 (b) second roller means mounted on said cargo compartment ceiling adapted to engage second runner means on the cargo container to support the cargo container for transverse sliding movement when the cargo container is intermediate the position external of the cargo compartment and the position wholly within the cargo compartment; said second roller means further adapted to disengage the second runner means when the cargo container is in the position wholly within the cargo compartment.

3. The combination as claimed in claim 1 wherein said cargo container engagement means comprises:
 (a) substantially hook-shaped members adapted to engage cooperating hook receiving flanges on the cargo container; and
 (b) said hook-shaped members being mounted on said lift rail members by means of yieldingly mounted detent means adapted to contact said hoist beam means when said lift rail members are vertically moved to the raised position and thereby disengage said hook-shaped members from the hook receiving flanges on the cargo container.

References Cited
UNITED STATES PATENTS

| | | | |
|---|---|---|---|
| 1,614,769 | 1/1927 | Amsler | 212—73 |
| 2,950,073 | 8/1960 | McLain et al. | 244—137 |
| 3,026,071 | 3/1962 | Barcellona | 214—16 |
| 3,028,130 | 4/1962 | Burton | 244—137 X |
| 3,151,904 | 10/1964 | Tantlingev | 294—67 |

GERALD M. FORLENZA, Primary Examiner

RAYMOND B. JOHNSON, Assistant Examiner

U.S. Cl. X.R.

212—73; 244—137; 294—67